United States Patent [19]

Reid

[11] Patent Number: 5,074,327

[45] Date of Patent: Dec. 24, 1991

[54] TOOLLESS-RESETABLE EARTHQUAKE TRIGGERED GAS AND FLUID CUTOFF VALVE

[76] Inventor: Edmund I. Reid, 2951 Admiral Court, Coquitlam, BC, Canada, V3C 4E8

[21] Appl. No.: 553,223

[22] Filed: Jul. 16, 1990

[51] Int. Cl.$^5$ ............................................. F16K 17/36
[52] U.S. Cl. ....................................... 137/38; 251/65
[58] Field of Search ........................... 137/38, 39, 375; 251/65

[56] References Cited

U.S. PATENT DOCUMENTS

| | | | |
|---|---|---|---|
| 3,731,670 | 5/1973 | Loe | 251/65 X |
| 4,572,233 | 2/1986 | Weedon | 137/375 |
| 4,750,705 | 6/1988 | Zippe | 251/65 |
| 4,785,842 | 11/1988 | Johnson | 137/38 |
| 4,817,657 | 4/1989 | Kovacs | 137/38 |

Primary Examiner—Robert G. Nilson

[57] ABSTRACT

A safety cut-off valve for gasses or fluids delivered to buildings which are severely damaged in earthquakes. The valve consists of a non-magnetic housing enclosing a magnetic valve piece which conjugally matches a non-magnetic valve seat to which communicate inlet and outlet so that when the valve piece occupies the seat the inlet and outlet are isolated. The internal enclosed valve piece is held away from the valve seat by an external permanent magnet which is toppled during earthquake thus releasing the internal valve piece into its seat and so closing the valve. By replacing the external permanent magnet in its correct position and orientation the internal valve piece is again drawn away from the seat opening the valve.

2 Claims, 1 Drawing Sheet

TOOLLESS-RESETABLE EARTHQUAKE TRIGGERED GAS AND FLUID CUTOFF VALVE

BACKGROUND OF THE INVENTION.

(a) Field of the Invention

This invention relates to an earthquake triggered gas or fluid cutoff valve which can be reset without disassembling in any way or employing tools of any kind. It is a safety device.

(b) Discussion of Prior Art.

During earthquakes supply pipes carrying flammable gas and other fluids into buildings are frequently undamaged whilst the buildings themselves are severely damaged. In order to avoid possible fires and other damage resulting from uncontrolled spillage from breaks within those buildings, the occupants are advised to shut off the supply valves immediately after an earthquake. Since occupants may be injured or absent this is not always possible. However, valves, which are automatically triggered by severe earthquakes, can be installed. A valve which encloses a valve piece which is in partial equilibrium above a matching valve seat will close, due to the valve piece falling, or being pushed, into the valve seat, when it is shaken in an earthquake.

These valves need to be reset by qualified personnel in order to restore service. The number of qualified persons who can reset these valves must necessarily be low in relation to the total population generally. The restoration of essential services could take a long time for currently manufactured automatic valves.

This invention allows any unqualified person to reset the valve without any tools by following simple instructions.

SUMMARY OF THE INVENTION

This invention relates to a toolless-resetable valve which will automatically close off the supply of gas or other fluid to a severely damaged building during an earthquake. The valve is held open by the mutual magnetic attraction between an internal valve piece, suspended above a valve seat joining the inlet and outlet to the valve, and an external magnet which will topple away from the valve housing during an earthquake. The removal of the external magnet will break the magnetic attraction thus allowing the internal valve piece to fall into the valve seat thus blocking the valve. Repositioning the external magnet will again open the valve.

No tools or skill are necessary to operate the valve.

DESCRIPTION OF PREFERRED EMBODIMENTS

Figure 2:
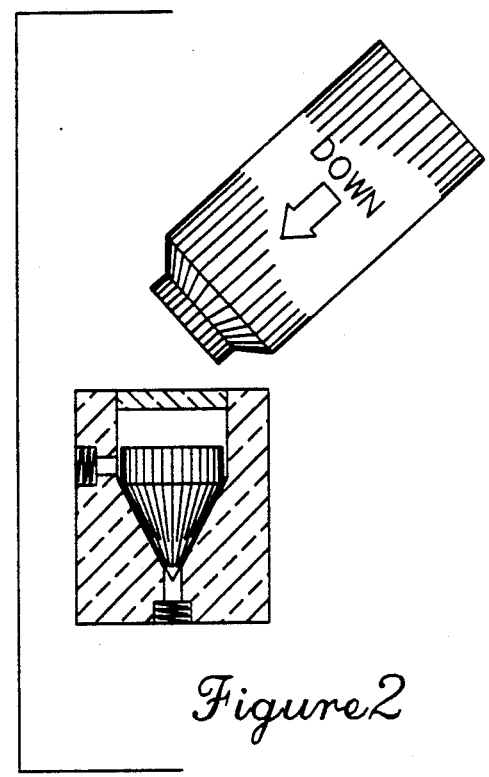
FIG. 2 is a view of the same pieces detailed in FIG. 1 but with the permanent external magnet shown in "mid-topple" and the internal magnetized valve piece in the closed position.
Figure 1:
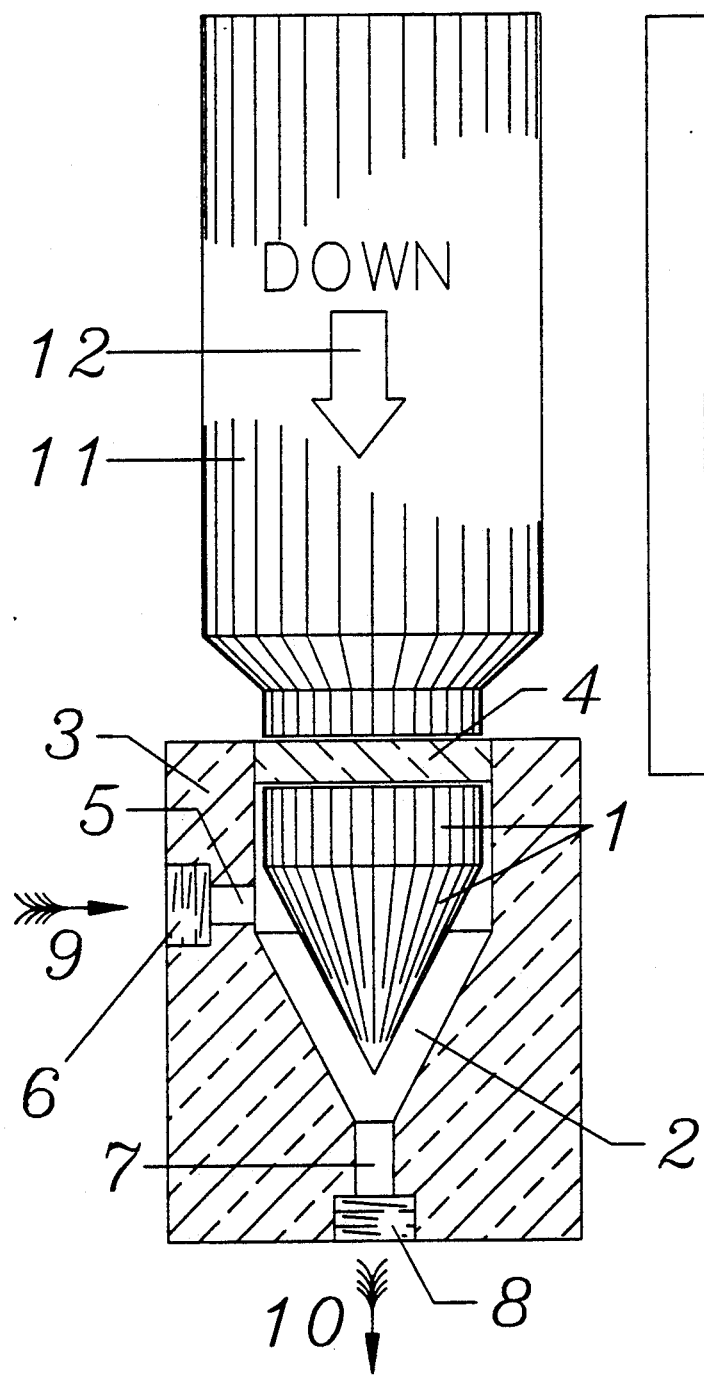
FIG. 1 is a view showing the body and seat of the valve on a vertical mid section together with the internal magnetized valve piece and external permanent magnet in isometric solid projection. The external permanent magnet is shown in position holding the valve piece open, by mutual attraction between these two pieces, against gravity.

Referring to FIG. 1, valve piece 1 comprises an internal permanent magnet accurately machined to a male shape conjugate with an accurately machined female valve seat 2 which is fashioned from the body and housing 3 of the valve comprising a non-magnetic material.

The surfaces of the valve piece 1 and the valve seat 2, where they are to come in contact with each other, when the valve is closed, may be lined with a resilient material which is not subject to corrosion by the substances to be passed through the valve.

The valve housing 3 is sealed gas-or-fluid tight by means of a sealing piece 4 which comprises a non-magnetic material.

An inlet 5 communicating with the valve seat 2 is fashioned from the body or housing 3 of the valve and is provided at its external opening with threads 6 or other pipe-to-valve connection meeting the standards of the national or local authority for the region within which the valve is to be employed.

An outlet 7 communicating with the valve seat 2 is fashioned from the body or housing 3 of the valve and is provided at its external opening with threads 8 or other pipe-to-valve connection meeting the standards of the national or local authority for the region within which the valve is to be employed.

The direction of flow of gas or fluid through the valve when open is indicated by arrow 9 for inlet 5 and arrow 10 for outlet 7. Arrow 10 also serves to indicate the direction of gravity with respect to the correct position for mounting the valve.

A separate external permanent magnet 11 of an elongated shape is machined so that its base is generally narrower than its average transverse width. When external magnet 11 is resting on its machined base on the valve housing 3 it is in partial stable equilibrium.

When mounted in the position shown, that is, with arrow 10 pointing in the direciton of gravitational acceleration, the external permanent magnet 11 and the internal magnetic valve piece 1 will attract each other vigorously thus keeping the valve open. Any failure in retention of magnetism or in the event of tampering, short of actual disconnection, will cause the valve to fail safe, that is, to close. Any large acceleration of the body of the valve, due to say, earthquake will cause the external permanent magnet 11 to topple thus causing the internal magnetic valve piece 1 to fall and close the outlet 7 which communicates with the valve seat 2.

A standard isolation valve, which is not part of this invention and which is, therefore, not shown on the drawing, is provided before the inlet near arrow 9. When the necessary checks for safety have been carried out the resetable valve may again be opened. This is done by isolating the valve by means of the standard isolation valve at the inlet. This is done to reduce any positive pressure within the body of the valve. The external permanent magnet 11 is then placed in its correct position. Magnetic attraction between pieces 1 and 11 will raise the piece 1 away from the valve seat 2 thus re-opening the valve. The isolation valve near arrow 9 may then be re-opened.

The narrower machined base of the external magnet 11 also serves to enable the user to identify its base which has opposite magnetic polarity to that of the usual upper portion of internal magnetized valve piece 1.

Suitable permanent symbols 12 can indicate the correct positioning of the external permanent magnet and similar symbols on the valve housing can indicate its correct positioning when it is being installed.

I claim:

1. A valve for closing off the flow of gasses or fluids when said valve is accelerated comprising:
 a non-magnetic housing enclosing a magnetic valve piece conjugal with a non-magnetic valve seat which communicates to inlet and outlet means for the passage of gasses or fluids such that when said magnetic valve piece sealingly occupies said non-magnetic valve seat it isolates inlet from outlet; and
 means of hermetically sealing said enclosed magnetic valve piece within said non-magnetic housing; and
 means of safely attaching supply pipe to said inlet and delivery pipe to said outlet of said non-magnetic housing; and
 a permanent external magnet, not being mechanically attached to said non-magnetic housing, which holds said enclosed magnetic valve piece vertically with respect to gravity, above and away from said non-magnetic valve seat thus opening said valve, wherein the improvement comprises
 said permanent external magnet which is of elongated shape such that the position of the centre of gravity of said permanent external magnet in relation to and above the base of said permanent external magnet will determine its sensitivity to toppling away from said non-magnetic housing and closure of the valve when said non-magnetic housing is accelerated thus allowing for simplicity of manufacture and selection of sensitivity.

2. A valve as claimed in claim 5 wherein said permanent external magnet is of elongated shape having permanent symbols thereon indicating correct positional placement on said non-magnetic housing; and
 wherein said enclosed magnetic valve piece which, when positioned within said non-magnetic housing, so that where it is nearest said permanent external magnet, has a polarity opposite to that of said permanent external magnet, thus being held vertically with respect to gravity, above and away from said non-magnetic valve seat thus opening said valve.

* * * * *